United States Patent
Al-Khoraidly et al.

(10) Patent No.: US 7,764,785 B2
(45) Date of Patent: Jul. 27, 2010

(54) METHOD FOR COMMUNICATING SECURELY OVER AN INSECURE COMMUNICATION CHANNEL

(75) Inventors: Abdulaziz Al-Khoraidly, Dhahran (SA); Mohammad K. Ibrahim, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 1520 days.

(21) Appl. No.: 10/982,906

(22) Filed: Nov. 8, 2004

(65) Prior Publication Data

US 2006/0098814 A1 May 11, 2006

(51) Int. Cl.
*H04L 9/28* (2006.01)
*H04L 29/06* (2006.01)
*H04L 9/32* (2006.01)
*H04K 1/00* (2006.01)
*G06F 12/14* (2006.01)
*G06F 17/00* (2006.01)
*G06F 15/173* (2006.01)

(52) U.S. Cl. ............... 380/28; 380/255; 713/150; 713/153; 713/160; 713/168; 713/189; 726/3; 726/14; 726/22; 709/223

(58) Field of Classification Search ............... 380/28, 380/255; 713/150, 153, 160, 168, 189; 726/3, 726/14, 22; 709/223
See application file for complete search history.

(56) References Cited

U.S. PATENT DOCUMENTS

| | | | |
|---|---|---|---|
| 6,298,442 B1 | 10/2001 | Kocher et al. | |
| 6,304,658 B1 | 10/2001 | Kocher et al. | |
| 6,381,699 B2 | 4/2002 | Kocher et al. | |
| 6,529,524 B1 * | 3/2003 | Liao et al. | 370/467 |
| 6,876,745 B1 * | 4/2005 | Kurumatani | 380/28 |
| 7,379,546 B2 * | 5/2008 | Ibrahim | 380/28 |
| 2001/0002486 A1 | 5/2001 | Kocher et al. | |
| 2001/0048741 A1 | 12/2001 | Kocher et al. | |
| 2001/0048742 A1 | 12/2001 | Kocher et al. | |
| 2002/0124178 A1 | 9/2002 | Kocher et al. | |
| 2003/0009696 A1 * | 1/2003 | Bunker et al. | 713/201 |
| 2003/0028771 A1 | 2/2003 | Kocher et al. | |
| 2003/0028803 A1 * | 2/2003 | Bunker et al. | 713/201 |
| 2003/0044014 A1 | 3/2003 | Liardet et al. | |
| 2006/0098824 A1 * | 5/2006 | Mao | 380/282 |
| 2007/0101123 A1 * | 5/2007 | Kollmyer et al. | 713/154 |

* cited by examiner

*Primary Examiner*—Aravind K Moorthy
(74) *Attorney, Agent, or Firm*—Lowe Hauptman Ham & Berner, LLP

(57) ABSTRACT

A method for enhancing the security of cryptographic systems against side channel attacks and cryptanalysis is based on the concept of object hopping or dynamic transformation of elements between objects that share the same category and/or floating objects which facilitate object hopping. The use of floating objects and floating finite fields to facilitate field hopping is also disclosed. Further, the use of curve hopping and floating elliptic curves to facilitate curve hopping and/or key floating when keys used in cryptosystems are floated through floating fields are also used for enhancing the security of cryptographic systems.

11 Claims, No Drawings

METHOD FOR COMMUNICATING SECURELY OVER AN INSECURE COMMUNICATION CHANNEL

FIELD OF THE INVENTION

This invention relates to a method for communicating securely over an insecure communication channel between a pair of correspondents using shared-key or public-key cryptographic protocols by implementing respective ones of a pair of complimentary mathematical operations and more particularly to a method for improving the security against side channel attacks and cryptanalysis.

BACKGROUND FOR THE INVENTION

Most cryptosystems require secure key management. For example, in public-key based security systems, private keys must be protected so that attackers cannot use the keys to forge digital signatures, modify data, or decrypt sensitive information. Systems employing symmetric cryptography similarly require that keys be kept secret. Therefore, well-designed cryptographic algorithms and protocols should prevent attackers, who eavesdrop on communications, from breaking into secure systems.

Further, Cryptographic algorithms and protocols traditionally require tamper-resistant hardware or other implementation-specific measures to prevent attackers from accessing or finding the secret keys.

If the cryptosystem designer can safely assume that the key management system is completely tamper-proof and will not reveal any information relating to the keys except via the messages and operations defined in the protocol, then previously known cryptographic techniques are often sufficient for good security. However, it is currently extremely difficult to make hardware key management systems that provide good security, particularly in low-cost unshielded cryptographic devices for use in applications where attackers will have physical control over the device. For example, cryptographic tokens (such as smartcards used in electronic cash and copy protection schemes) must protect their keys even in potentially hostile environments. A token is a device that contains or manipulates cryptographic keys that need to be protected from attackers. Forms in which tokens may be manufactured include, without limitation, smartcards, specialized encryption and key management devices, secure telephones, secure picture phones, secure web servers, consumer electronics devices using cryptography, secure microprocessors, and other tamper-resistant cryptographic systems.

If timing is the only source of leaked information, securing the device is often relatively straightforward. For example, previously known countermeasures against attacks involving information leaking from cryptosystems employ large and often expensive physical shielding and/or careful filtering of inputs and outputs (e.g., U.S. government Tempest specifications). Unfortunately, these techniques are difficult to apply in constrained engineering environments. For example, physical constraints (such as size and weight), cost, and the need to conserve power can often prevent the use of such techniques. It is also known to use certain computational techniques to equalize timing and hence, protect the system from timing attacks. However, sources of information leakage other than timing (e.g., a device's power consumption) provide other avenues of attacks that are collectively called Differential Power Attacks (DPA). It would therefore be advantageous to protect the devices' internal operations themselves instead of, or in addition to, simply externally masking the devices' timing or other fluctuations.

Some techniques for hindering external monitoring of cryptographic secrets are known, such as using power supplies with large capacitors to mask fluctuations in power consumption, enclosing devices in well-shielded cases to prevent electromagnetic radiation, message blinding to prevent timing attacks, and buffering of inputs/outputs to prevent signals from leaking out on I/O lines. Shielding, introduction of noise, and other such countermeasures are often, however, of limited value, since skilled attackers can still find keys by amplifying signals and filtering out noise or by averaging data collected from many operations. Furthermore, in smartcards and other tamper-resistant chips, these countermeasures are often inapplicable or insufficient due to reliance on external power sources, impracticality of shielding, and other physical constraints. The use of blinding and constant-time mathematical algorithms to prevent timing attacks is also known, but does not prevent more complex attacks such as power consumption analysis particularly if the system designer cannot perfectly predict what information will be available to an attacker, as is often the case before a device has been physically manufactured and characterized.

Other than the physical countermeasures already outlined, there are some countermeasures that are not physical in nature, but, alternatively, protect cryptographic algorithms from DPA by applying slight modifications to the algorithms themselves. Hence, the cost involved in applying the physical measures will vanish. However, such methods introduce their own cost that results from the additional operations performed in order to de-correlate the power-consumption of the circuit with the values of the hidden information that are processed.

Among these are the method disclosed by Kocher et al in the U.S. Pat. No. 6,298,442, by which the key is protected during the operation of modular exponentiation. Through the fact that the operations of modular squaring and modular multiplications can be performed on the same hardware, they proceed by recoding the key into a series of separate multiplication and squaring steps. Hence, the power consumption of the circuit and the memory access will be independent of the original key digits. This method is clearly limited to field exponentiation which can be implemented as a sequence of field squaring and multiplication. Squaring can be considered as a special case of multiplication. The application of this method to elliptic curve cryptography is not practical since the basic operations of scalar multiplication of point doubling and point addition are completely different from each other. They are implemented using different mathematical expressions.

Another technique is the one disclosed by Kocher et al in the U.S. Pat. Nos. 6,304,658 and 6,381,699, and the US patent applications Nos. 20010002486 and 20030028771. In these publications, the authors introduce the concept of a "self-healing" system, which is the system in which the leaked information loses its value by time (i.e., after the encryption of several messages). They achieve such a property by dynamically changing the key, which renders all the leaked information about the old key useless. However, this introduces some computational overhead. Another technique, introduced by the same authors, is disclosed in a US patent application No. 20020124178. As disclosed therein the authors suggest that a piece of hardware can skip some clock cycles to confuse an observer. This, however, introduces some hardware and time inefficiency and causes problems, as stated in the publication itself, when performing serial communication, which requires strict timing.

Another publication, the US Patent Application No. 20010048741 by Okeya, uses a different strategy to protect the cryptographic process. In this method, which is specific to elliptic curve cryptography, addition and doubling are performed in every step, which creates a pre-determined order of execution that is independent of the key value. Likewise, Handschuh, in the US Patent Application No. 20010048742, introduces a method in which the key is represented as the difference of two quantities. Then, each of these quantities is used in a scalar multiplication, of which the results are subtracted to get the needed result. Moreover, the US Patent Application No. 20030044014, authored by Liardet, discloses random multiples of the modulus to randomize the performed modular operations.

One successful measure against DPA on elliptic curve cryptosystems is based on using randomized projective coordinates. This is a measure against the attack method of observing whether a specific value appears or not in elliptic curve scalar multiplication calculation, and inferring a scalar value from the observed result.

It is significant to note that the underlying basis of randomized projective coordinate is that by multiplication with a random value, the appearance of such specific values is uncorrelated with the value of the scalar multiplicand.

It should be pointed out that the application of randomized projective coordinates is rather restricted because of its major drawback of requiring expensive field multiplication operations. For this reason, it is usually applied once per elliptic curve scalar multiplication.

There are some common characteristics among all the discussed countermeasures. Firstly, all of them introduce a significant amount of inefficiency. To prevent the attack by power analysis, an extra amount of calculation other than necessary has to be carried out using secret information so that the dependence of the cryptographic processing on the secret information is weakened. Thus, time required for the cryptographic processing increases and the cryptographic processing efficiency will be lowered noticeably in a computer, such as a smart card, which is slow in calculation speed, or a server managing an enormous number of cryptographic processes.

Clearly, as side-channel attacks become more sophisticated, more involved countermeasures need to be applied. This ultimately leads to the requirements of more elaborate and computationally efficient countermeasures.

Another common characteristic of the countermeasure discussed above is that all of them help only in enhancing the immunity of the cryptographic system against DPAs. They do not provide any provisions to enhance the security of the underlying cryptographic protocol against cryptanalysis.

It would be very significant to have a framework/methodology where the introduced countermeasures are not only effective against side channel attacks but also increase the security of the underlying cryptographic protocol.

This is important since it can be argued that a framework/methodology that enhances the security of the underlying protocol implies that a smaller key size would be needed than that required by an equivalent protocol with no enhanced security measures. It can then be argued that the enhanced security of the underlying cryptographic protocol would also compensate for any inefficiency introduced by the added countermeasure since it would allow the use of a smaller key size.

Clearly, such a comprehensive framework for enhancing the security of cryptographic applications is highly desirable.

Two further approaches to methods for communicating securely over an insecure communication channel are disclosed in the co-pending applications of Mohammad K. Ibrahim entitled "Elliptic Polynomial Cryptography with Multi X-Coordinates Embedding" Ser. No. 10/911,701 filed Aug. 5, 2004 and "Elliptic Polynomial Cryptography with Multi Y-Coordinates Embedding" Ser. No. 10/911,702 filed Aug. 5, 2004 both of which are assigned to the same Assignee as the present invention and both of which are incorporated herein in their entirety by reference.

BRIEF SUMMARY OF THE INVENTION

This invention describes a method that builds on the concept of a category to enhance the security of cryptographic systems against both side-channel attacks and cryptanalysis.

In abstract algebra, a category is a collection of mathematical objects between which structural similarities exist. By definition, the objects that share the same category are mapped to each other through homomorphic transformations.

Based on the concept of a category, the invention introduces the concept of object hopping which is the main tool for enhancing the security of cryptosystems against both side-channel attacks and cryptanalysis. The term object hopping is used to indicate a dynamic transformation of elements between objects that share the same category.

In addition, a concept of a floating object is introduced as an embodiment of a category. Floating objects are used to facilitate object hopping in an efficient way. Floating an object is achieved by mapping its elements using a parametric transformation to elements of other objects that share the same category. To be more specific, a floating object is a combination of:

1. an object (denoted as the base object).
2. a one-to-one parametric transformation function $\tau$ that can be used to transform the elements of any of the base object to elements of other homomorphic objects. Being parametric means that $\tau$ accepts one or more parameters that control the transformation, which is necessary to make the transformation flexible.

Given such transformations, operations can be defined to accept elements from different object as operands and produce elements belonging to different objects as results.

When the transformation function $\tau$ is bijective, i.e. one-to-one and onto, the mapping becomes isomorphic and the floating object becomes an isomorphic floating object.

The concept of floating finite fields, which is an embodiment of the concept of a floating object, is then introduced. Floating finite fields are used to facilitate the realization of the concept of field hopping, which is an embodiment of object hopping.

Another embodiment of object hopping is the concept of elliptic curve hopping, a.k.a. curve hopping. In this case, the underlying objects are groups over elliptic curves. Usually in elliptic curve-based cryptosystems, the curve on which the encryption/decryption operations are performed is fixed and may be public. However, based on the concept of curve hopping, this curve can be replaced dynamically with other curves that belong to the same category. Using curve hopping will significantly increase the security of a cryptographic system against both side-channel attacks and cryptanalysis.

The concept of a floating elliptic curve, which is an embodiment of the concept of a floating object, is then introduced. Floating elliptic curves are used to facilitate the realization of curve hopping.

An additional concept of key floating is introduced as another embodiment of object hopping. In such case, the keys used in cryptosystems are floated through floating fields.

In essence, the present invention contemplates a method for communicating securely over an insecure communications channel between a pair of correspondents using shared-key or public-key cryptographic protocols by implementing respective ones of a pair of complimentary mathematical operations. The method includes the step of assembling a data string including information to be transferred from a sending correspondent to a receiving correspondent and performing a complimentary mathematical operation using points that satisfy a polynomial equation wherein all of the coordinates of such points are elements of a finite field. A key feature in the present invention resides in the step of enhancing the security against side channel attacks and cryptanalysis by object hopping or by a dynamic transformation of elements between objects that share the same category. Then, the defined set of points are forwarded over a communication channel to the receiving correspondent who performs the other of the corresponding mathematical cryptographic operations to decrypt the data.

In a preferred embodiment of the invention, objects that share the same category are mapped to each other through homomorphic transformations. The invention also contemplates a method wherein a floating object is achieved by mapping its elements using a parametric transformation to elements of other objects that share the same category and more particularly to a method wherein a floating object is a combination of a base object and a one to one paramedic transformation function $\tau$ as used to transform the elements of any of the base objects to elements of other homomorphic objects.

DETAILED DESCRIPTION OF THE INVENTION

1. Object Hopping and Floating Objects:

1.1 Background Definitions of Known Abstract Algebra Terms

In abstract algebra, two mathematical objects are said to be homomorphic when there exists a similarity of their structures that preserves the operations defined within these objects. More formally, taking groups as an example for mathematical objects, a homomorphism from a group $(G_1, *_1)$ to a group $(G_2, *_2)$ is defined as a function $f: G_1 \to G_2$, such that $$\forall a,b \in G_1 : f(a *_1 b) = f(a) *_2 f(b) \qquad (1)$$

A similar homomorphic relationship can be defined between mathematical objects of any class, like rings or fields.

The different characteristics of the transformation function $f$ lead to different types of homomorphisms. For example, if the function $f$ is bijective, i.e. both one-to-one and onto, then the homomorphism is an isomorphism, which indicates perfect similarity between isomorphic objects. An isomorphism between an object and itself is called an automorphism.

A category C is defined to consist of the following:

1. A collection of objects.
2. For every ordered pair of objects (A, B), where A,B$\in$C, there exists a non-empty set of homomorphisms from A to B, denoted as hom(A,B), such that:
   a. These homomorphisms are associative, i.e. there exists a composition function $\circ$: hom(A,B)$\times$hom(B,D)$\to$hom(A,D) where A,B,D$\in$C.
   b. $\forall A \in C$, $\exists I_A \in \text{hom}(A,A)$ such that $I_A \circ f = f$ and $g \circ I_A = g$ whenever f and g are defined. $I_A$ is denoted as the identity homomorphism of A, which is unique.

1.2 Object Hopping: Building Upon Categories

Almost all cryptographic schemes are based on the characteristics of mathematical objects like groups and fields. Hence, the security enhancements that utilize properties of these objects enhance the security of all corresponding cryptographic schemes.

Based on the relationship between objects that share the same category, object hopping is defined to be a dynamic replacement of the object under consideration with other objects that share the same category. This dynamic replacement can be of any frequency, i.e. can be very frequent or, at the other extreme, performed only once.

As disclosed herein, object hopping is the main mechanism for enhancing the security of cryptosystems against both cryptanalysis and side-channel attacks. In the following, its applications in both of these frontiers are explored.

A. Object Hopping as a Countermeasure Against Side-Channel Attacks

As earlier mentioned, side-channel attacks are built upon some statistical models which utilize the information leaked during processing to discover some hidden facts. Clearly, if the correlation between the leaked information and the hidden facts is broken or reduced, the immunity of the system will be increased. As indicated earlier, one effective mean of minimizing this correlation is through the randomization of computations.

Object hopping will help in this regard since it offers a platform for operations on a certain mathematical object to be performed on a set of similar objects with different elements and operations. Without knowing exactly on which object the operations are performed, information leaked to the attacker will not be of much use, especially if object hopping is randomized.

For example, if the cryptographic system under consideration defines a group on which encryption/decryption operations take place, the immunity of this system can be enhanced by employing group hopping based on the category to which the group belongs. In this case, encryption/decryption operations can be performed on the elements of any one of the groups that belong to the same category. The choice of the group (or the set of groups) on which the operations are performed can be randomized. Hence, the usefulness of the leaked information will diminish.

Such applications of object hopping can be easily isolated and localized in the boundaries of a single party, i.e. no changes have to be made to the protocol agreed upon among parties. Only the party that requires higher immunity against side channel attacks needs to apply the described countermeasures.

B. Object Hopping as an Enhancement to the Existing Cryptographic Protocols

Ciphered data is exchanged using mathematical objects, like groups and fields. Object hopping can be helpful in enhancing the security of existing Cryptographic Protocols by using a set of homomorphic objects for data exchange rather than using a single object as in current systems. In order to break the system, it is necessary for the attacker to know first in which object of the category the ciphered data exists. This adds an additional layer of complexity that, in turn, enhances the security of the protocol used.

As an example, going back to a cryptographic system that uses groups, the parties usually agree upon a group to be used to represent ciphered data. However, when the category that includes this group is employed instead through object hopping, the ciphered data can be in any of the groups that share the same category. If the exact group used is hidden, the task of breaking the system will be much more difficult since the attacker must find out first the group to which the ciphered data belongs.

Moreover, this application of object hopping can be combined with the countermeasure in section 1.2.A above to achieve an enhancement of security in both aspects of security enhancement, namely, (i) a countermeasure against side-channel attacks, and/or (ii) as an enhancement to the underlying cryptographic protocol against cryptanalysis. The fact that this is possible with minimal cost is one of the most valuable advantages of adopting the concept of object hopping to enhance the security of cryptographic systems.

1.3 Floating Objects: Facilitating Object Hopping

As mentioned earlier, object hopping has a great potential for enhancing the security of cryptographic systems. For this concept to be realized efficiently, an efficient method of mapping (or transforming) elements among objects should be devised. An example of such method is the concept of floating objects, which are characterized by a combination of simplicity and effectiveness.

A floating object is defined as a combination of:
1. an object (denoted as the base object).
2. a one-to-one parametric transformation function $\tau$ that can be used to transform the elements of any of the base object to other homomorphic objects. Being parametric means that $\tau$ accepts one or more parameters that control the transformation. This is necessary to make the transformation flexible.

As an example, to create a floating group, it is required to choose a group to be the base group. Then, it is required to choose a transformation function that is parametric. The set of parameters that are given to that function defines a set of groups that are homomorphic to the base group. Elements of the base group are floated based on this set of parameters.

It should be emphasized that any mathematical object for which a category exists can be floated.

It should be noted also that when the transformation function $\tau$ is bijective, i.e. one-to-one and onto, the mapping becomes isomorphic and the floating object becomes an isomorphic floating object. This special case is helpful when perfect similarity between objects is essential.

In this disclosure, emphasis will be put on the floating finite fields and the floating elliptic curves (an example of a floating group) as preferred embodiments of floating objects. This does not imply any restrictions neither to the applicability of the concept of object hopping, nor the concept of a floating object, as enhancements of the security of cryptographic systems in both aspects of security (i) as a countermeasure against side-channel attacks, and/or (ii) as an enhancement to the underlying cryptographic protocol against cryptanalysis.

2. Floating Finite Fields

This section introduces a preferred embodiment of the concept of floating objects.

2.1 Definition

Let $\mu$ denote either an arbitrary base in the case of $GF(p)$, which may or may not be a power of 2 or the root of the irreducible polynomial, namely $\alpha$, in the case of $GF(p^m)$. On a given finite field K, define a set $K' \subseteq K$ and a two-input function $\tau$ as:

$$\tau(x,\kappa) = x\mu^{-\kappa} \qquad (2)$$

where $x \in K$, $\kappa \in K'$. Let ${}^\kappa\tilde{x}$ denote the result of this transformation of x with a parameter $\kappa$. It follows that x can be represented as ${}^0\tilde{x}$. The function $\tau$ is clearly one-to-one and onto, i.e. bijective. This definition of $\tau$ is not the only one possible. In fact, any one-to-one function can be used. Since the mapping is one-to-one, any ${}^\kappa\tilde{x}$ can be transformed back to the corresponding x using $\tau^{-1}$ as follows:

$$x = \tau^{-1}({}^\kappa\tilde{x},\kappa) = {}^\kappa\tilde{x}\mu^{\kappa} \qquad (3)$$

The transformation rule can be generalized for any exponents $\kappa_1$ and $\kappa_2$. To transform ${}^{\kappa_1}\tilde{x}_1$ to ${}^{\kappa_2}\tilde{x}_2$ the following is applied:

$$^{\kappa_2}\tilde{x}_2 = x\mu^{-\kappa_2} = (x\mu^{-\kappa_1})\mu^{-\kappa_2+\kappa_1} = {}^{\kappa_1}\tilde{x}_1\mu^{\kappa_1-\kappa_2} \qquad (4)$$

For a fixed $\kappa$, the field defined on elements generated by $\tau$ for all $x \in K$, i.e. on all ${}^\kappa\tilde{x}$ for a particular value of $\kappa$, is a finite field that is isomorphic to K. The set of all these isomorphic fields, which can be generated using different values of $\kappa$, is denoted by S. It follows that by defining K, K', $\mu$ and $\tau$, all the isomorphic fields are defined, and so, S is defined.

Let $\tilde{K}$ be the set of all elements ${}^\kappa\tilde{x}$, where $\kappa \in K'$ and $x \in K$. In this case, $\tilde{K}$ is a floating finite field defined over K. As will be shown in the next section, addition and multiplication operations can be defined on $\tilde{K}$.

It is very significant to note that, with regard to $GF(p)$, the choice of $\mu$ to be a power of 2, or a power of $\alpha$ in the case of $GF(p^m)$, makes all related computations much more efficient since it maps to a shift-and-reduce operation rather than a full-precision multiplication. In this case, any efficient modular reduction algorithm can be used. It is this fact that makes floating finite fields such an attractive mechanism to adopt as it introduces minimum overhead.

2.2 Operations

Operations defined on a floating finite field are very similar to those defined on a conventional finite field except in one aspect, that is, operands and results of these operations may fall in different finite fields within S, the set of isomorphic finite fields. It is noteworthy to mention that all the primitive operations used to define the floating finite field operations are the same finite field operations defined on K.

A. Addition:

Addition in floating finite field can be performed by transforming the operands to a common finite field and then performing the operation there, i.e.

$$\begin{aligned}{}^{\kappa_3}\tilde{x}_3 &= {}^{\kappa_1}\tilde{x}_1 + {}^{\kappa_2} \\ \tilde{x}_2 &= x_1\mu^{-\kappa_1} + x_2\mu^{-\kappa_2} = (x_1\mu^{\kappa_3-\kappa_1} + x_2\mu^{\kappa_3-\kappa_2})\mu^{-\kappa_3} = {}^{\kappa_3}( \\ &\tilde{x}_1\mu^{\kappa_3-\kappa_1} + \tilde{x}_2\mu^{\kappa_3-\kappa_2})\end{aligned} \qquad (5)$$

Note that the value of $\kappa_3$ is not influenced by $\kappa_1$ or $\kappa_2$. Hence, this value can be determined before the addition or can be even generated at random.

B. Multiplication:

Multiplication operation in a floating finite field can be defined as:

$$^{\kappa_1}\tilde{x}_1 \cdot {}^{\kappa_2}\tilde{x}_2 = x_1\mu^{-\kappa_1} \cdot x_2\mu^{-\kappa_2} = x_1 x_2 \mu^{-(\kappa_1+\kappa_2)} = {}^{\kappa_1+\kappa_2}(\tilde{x}_1\tilde{x}_2) \qquad (6)$$

Note that the product of two floating finite field elements falls in a finite field that may differ from the ones in which the operands fall. Moreover, it is possible to randomize the finite field to which the result will belong by applying a transformation operator on the result of the multiplication, i.e.

$$\begin{aligned}{}^{\kappa_1}\tilde{x}_1 \cdot {}^{\kappa_2}\tilde{x}_2 &= x_1 x_2 \mu^{-\kappa_1-\kappa_2} = (x_1 x_2 \mu^{-\kappa_1-\kappa_2+\kappa_3})\mu^{-\kappa_3} = {}^{\kappa_3}(\tilde{x}_1 \\ &\tilde{x}_2\mu^{-\kappa_1-\kappa_2+\kappa_3})\end{aligned} \qquad (7)$$

where $\kappa_3$ indicates the finite field to which the result belongs. Clearly, the value $\kappa_3$ can be randomized or set prior to the multiplication.

3. Applications of Floating Finite Fields

Being an embodiment of the floating object concept, floating finite fields are suitable to implement finite field hopping, which is an embodiment of object hopping. Field hopping can be used to enhance the security of cryptographic systems in both aspects (i) a countermeasure against side-channel attacks, and/or (ii) as an enhancement to the underlying cryptographic protocol against cryptanalysis. The following items describe some of the possible ways to exploit floating finite fields and finite field hopping in various cryptographic applications.

A. Countermeasures Against Side-Channel Attacks:

Side-channel attacks are those attacks that target the implementation platform rather than the cryptographic algorithm itself. A major category of side-channel attacks is the power analysis attacks, which mainly depend on monitoring the power consumption of the circuit when performing the related computations. Such analysis can be simple or differential. As the name indicates, the former uses a single snapshot of the power profile of the circuit while the latter uses many observations and applies some advanced statistical methods, which have proven to be very effective. Other categories of side-channel attacks monitor different aspects of the circuit operation.

Finite fields hopping can be used effectively as a countermeasure against various types of side-channel attacks. This is achieved by exploiting the flexibility of floating finite fields in the sense that the representation of any element can be randomized throughout the computation while preserving its value.

As already shown while discussing the floating finite field operations, the field in which the sum of two numbers falls is independent of the fields of the operands. Moreover, the multiplication operation can be defined in the same way by appending a field transformation operator to it. With this flexibility exploited, the behavior of a field operation will be different each time even if it is applied to the same operands. Combined with the fact that it carries a minimal overhead when $\mu$ is chosen to be a power of 2 in the case of GF(p) or $\alpha$ in the case of GF($p^m$). This shows that the use of floating finite fields (to implement finite field hopping) is an effective and efficient countermeasure against side-channel attacks, which is applicable to all cryptographic schemes based on fields.

Another way of exploiting the use of floating finite fields as a countermeasure against side-channel attacks is to relate the exponent of a particular element to the location where it will be stored, i.e. an address in the memory or the register file. Consequently, the place where a value will be stored is unknown for the observer and the pattern in which values are accessed is randomized. However, to avoid addressing conflicts, different elements should always have different exponents, which is achievable through field transformation. Another way to avoid addressing conflicts is to use the hardware itself to determine the required exponent of a particular element, i.e. if an element is to be stored in a particular location, it must have an exponent that is equal to that location's address. In such a way, the hardware would be used to control the calculations that are performed on it.

Another embodiment of object hopping in randomizing the internal computation in elliptic curve systems is key floating. In this embodiment, the key is changed dynamically when used in scalar multiplication operations. This is achieved by floating the field on which the key is defined. To balance the effect of the factor used for floating the key, an appropriate multiple of the point, which may be precomputed, should be used as follows:

$$kP = \mu^{-e_k} k \cdot \mu^{e_k} P = {}^{e_k}\tilde{k} \cdot \mu^{e_k} P \tag{8}$$

In this case, ${}^{e_k}\tilde{k}$ is the floated key while $\mu^{e_k} P$ is the multiple to be precomputed. If a proper number of multiples of P is precomputed and stored, key floating can be used as a countermeasure against DPAs.

It is noteworthy that such applications of floating finite field are independent of the cryptographic protocol being used. In other words, if one of the parties involved in a secure communication session uses floating finite fields to randomize its internal operations, this usage is transparent to all other parties and they need not be aware of it. Such provision for an encapsulated application of floating finite fields without affecting the overall cryptographic protocol enables its immediate adoption in any of the existing protocols. It also motivates its usage on platforms that are highly endangered by side-channel attacks, like smart cards or a hand-held device, without the need to perform any changes to their base stations.

B. Enhancing the Protocol Security Through Floating Finite Fields:

Floating finite fields can be exploited to enhance the security of the existing protocols through implementing finite field hopping. One possible and attractive enhancement is the one called the mid-field protocol, in which the parties agree on a particular field to use while exchanging encrypted data. This agreement can be made, for example, through negotiation or can be encoded as part of the shared secret key. By hiding the details of the mid-field, it will be more difficult to attack the system through cryptanalysis, since decrypting the data is no longer enough to reveal the hidden message. As mentioned earlier, this enhancement (or any other enhancement built on floating finite fields) can be applied to all cryptographic schemes based on fields.

An alternative is to implement finite field hopping fully where the relevant parties agree on a starting field, which may or may not be hidden. Then, throughout the communication process, this field is updated dynamically by an agreed upon scheme. Such scheme may use a fixed sequence of fields or define a way to choose a field based on some contextual information.

It should be noted that the use of such sequence offers a mean of authentication of a party based on the sequence used. Furthermore, the sequence can be randomly generated. In this case, all parties should have the same random-number generation scheme applied to ensure consistency.

Another application of the floating finite field, which also has a significant potential in increasing the security of almost all cryptographic systems, is key floating. In this application, the key, being an element of the field K, is floated. As a result, parties can change the key regularly based on an agreed upon sequence or even randomly. This will greatly enhance the immunity of the system in two ways:

1 it will make the task of an observer that applies DPA more difficult since the key is regularly changing and all the leaked information, if any, would then become randomized and hence useless.
2 it will enhance the security of the protocol against cryptanalysis since the lifetime of a key will be much shorter that the time needed by an attacker to break it. This increased security suggests decreasing the size of the effective key, which will directly enhance the efficiency of the system without any sacrifice in the security.

The fact that floating finite field can be readily used to randomize the underlying computations, as shown previously, suggests that any combination of the schemes mentioned in section 3.A and 3.B above can be used to enhance the immunity of cryptographic schemes to side-channel attacks while, at the same time, making their cryptanalysis more complex.

3. Defining New Cryptographic Schemes

In addition to the previous two categories of applications, floating finite fields can be used to define new cryptographic schemes, which can be inherited from existing schemes or by even developing brand-new ones. Since they are based on floating finite fields, these schemes will be inherently immune to side-channel attacks and difficult to crack by cryptanalysis. An example of such schemes, which are inherited from existing ones, is the floating elliptic curve, which is defined in a following section.

4. Elliptic Curve Hopping

4.1 Introduction

In almost all cryptographic schemes based on elliptic curves, it is common that the curve on which the encryption/decryption processes take place is publicly agreed upon during an initialization phase and is fixed throughout the whole session.

An alternative to this common practice is to use an embodiment of object hopping which we term elliptic curve hopping.

Elliptic curve hopping is defined as dynamically changing the curve on which the calculations take place throughout a session. Elliptic curve hopping can be transparent, so that its effect is limited to a single party, or it can be part of the protocol agreed upon by all parties.

Elliptic curve hopping has different applications based on the scope on which it is applied. In general, these applications can be divided into two overlapping categories, namely, using it as a countermeasure against DPA or using it to enhance the security of the cryptographic protocol against cryptanalysis.

A. Elliptic Curve Hopping as a Countermeasure Against DPA:

A party that is involved in an elliptic-curve-based secure communication can use elliptic curve hopping to protect its internal computations against DPA by dynamically changing the curve it uses for encryption/decryption processes. In this case, multiple observations that are collected by the observer will not be useful in compromising the security of the elliptic curve cryptosystem since they are based on different curves rather than a single one.

Further, this elliptic curve hopping application, being internal to the party applying it, requires no attention from other parties since the concerned party will convert back the results of its computation to the agreed upon base curve before transmitting them. This is particularly important when it is required to maintain backward compatibility with existing algorithms and structures. Moreover, this permits clients in hostile environments (e.g., smartcards, hand-held devices and all other security-related mobile devices) to protect themselves from DPA without introducing any additional overhead on the base station (e.g., the secure server).

B. Enhancing the Security of Cryptography Protocols:

On the other hand, elliptic curve hopping can be applied based on a common agreement of the involved parties. In this case, the parties will exchange their messages using a regularly changing curve based on an agreed upon mechanism of elliptic curve hopping. This mechanism can be based on a set of predetermined curves or using a hopping function that defines the following curve to be used. Clearly, if the curve on which messages are exchanged is hidden and regularly changing, the cryptanalysis problem becomes more complicated. Hence, the security of the whole protocol will be enhanced. One should note that this application of elliptic curve hopping includes implicitly the countermeasure against DPAs described earlier, which adds to the value of this application. Another point to be noted here is that the additional security achieved by this application allows for reducing the key size, which will directly enhance the efficiency of the encryption/decryption process when compared to the one achieved through a conventional system that does not utilize elliptic curve hopping.

4.2 Implementation of Elliptic Curve Hopping

To implement elliptic curve hopping, it is required to find a mapping that can be used to transform the points and operations from one curve to another in such a way that the result of any operation on the new curve can be mapped back to the result of the same operation on the original curve, i.e. a homomorphic mapping.

In the following sections, mappings based on the concept of floating objects that can be used to implement elliptic curve hopping are introduced.

5. The Floating Elliptic Curve (FEC)

5.1 Definition

In general, an elliptic curve defined on GF(p) has the following equation:

$$y^2 = x^3 + ax + b \quad (9)$$

where $a,b,x,y \in K$. Hence, each variable can be independently represented using the floating finite field $\tilde{K}$ as follows:

$$a = {}^{e_a}\tilde{a}\mu^{e_a},$$

$$b = {}^{e_b}\tilde{b}\mu^{e_b},$$

$$x = {}^{e_x}\tilde{x}\mu^{e_x}$$

and $$y = {}^{e_y}\tilde{y}\mu^{e_y} \quad (10)$$

Through rewriting the equation of the elliptic curve using the new representation, one obtains:

$$^{e_y}\tilde{y}^2\mu^{2e_y} = {}^{e_x}\tilde{x}^3\mu^{3e_x} + {}^{e_a}\tilde{a}\cdot{}^{e_x}\tilde{x}\mu^{e_x+e_a} + {}^{e_b}\tilde{b}\mu^{e_b} \quad (11)$$

The four exponents $e_a$, $e_b$, $e_x$ and $e_y$ are independent from each other. Hence, this formula describes the most general form of the Floating Elliptic Curve (FEC), which is defined by a base elliptic curve and a set of possible values for each of the four exponents. Any elliptic curve can be used as a base curve including Montgomery type or any other special type.

It should be obvious that some restrictions on the values of the four exponents can be applied for reasons such as isomorphism, avoiding super-singularity, reducing storage requirements, etc.

Accordingly, points can be transformed between the set of elliptic curves defined by an FEC by varying any of the four exponents given in equation (11).

5.2 Point Operations on an FEC

There are two point operations defined on conventional elliptic curves. The first operation is addition where two points, P and Q, are added by constructing the straight line that passes through them. That straight line will intersect the curve in a third point whose inverse is denoted as the sum P+Q. The other operation is doubling, where the tangent of the curve at the point to be doubled, P, is constructed. Then, the inverse of the point of intersection of that straight line with the curve is considered as 2P. All other multiples of a point are obtained through several addition and doubling operations.

On FEC, points involved in point operations can belong to different elliptic curves, i.e. with different values for the four exponents. Such operations are performed by transforming the points into a common curve on which the operation is performed using the conventional point addition and doubling rules. Then, the resultant point can be transformed to any other curve belonging to the FEC under consideration.

For example, let us consider the following curves $$E_1: {}^{ey1}\tilde{y}^2 \mu^{2ey1} = {}^{ex1}\tilde{x}^3 \mu^{3ex1} + {}^{ea1}\tilde{a} \cdot {}^{ex1}\tilde{x}\mu^{ex1+ea1} + {}^{eb1}\tilde{b}\mu^{eb1} \qquad (12)$$

$$E_2: {}^{ey2}\tilde{y}^2 \mu^{2ey2} = {}^{ex2}\tilde{x}^3 \mu^{3ex2} + {}^{ea2}\tilde{a} \cdot {}^{ex2}\tilde{x}\mu^{ex2+ea2} + {}^{eb2}\tilde{b}\mu^{eb2} \qquad (13)$$

$$E_3: {}^{ey3}\tilde{y}^2 \mu^{2ey3} = {}^{ex3}\tilde{x}^3 \mu^{3ex3} + {}^{ea3}\tilde{a} \cdot {}^{ex3}\tilde{x}\mu^{ex3+ea3} + {}^{eb3}\tilde{b}\mu^{eb3} \qquad (14)$$

If it is required to add the points $P_1(\tilde{x}_1, \tilde{y}_1) \in E_1$ and $P_2(\tilde{x}_2, \tilde{y}_2) \in E_2$ to get a point $P_3(\tilde{x}_3, \tilde{y}_3) \in E_3$, then the following equations give the value of $\tilde{x}_3$ and $\tilde{y}_3$ in terms of the coordinates of $P_1$ and $P_2$:

$$\tilde{x}_3 \mu^{ex3} = \left( \frac{\tilde{y}_2 \mu^{ey2} - \tilde{y}_1 \mu^{ey1}}{\tilde{x}_2 \mu^{ex2} - \tilde{x}_1 \mu^{ex1}} \right)^2 - \tilde{x}_1 \mu^{ex1} - \tilde{x}_2 \mu^{ex2} \qquad (15)$$

$$\tilde{y}_3 \mu^{ey3} = (\tilde{x}_1 \mu^{ex1} - \tilde{x}_3 \mu^{ex3}) \left( \frac{\tilde{y}_2 \mu^{ey1} - \tilde{y}_1 \mu^{ey1}}{\tilde{x}_2 \mu^{ex2} - \tilde{x}_1 \mu^{ex1}} \right) - \tilde{y}_1 \mu^{ey1 - ey3} \qquad (16)$$

On the other hand, if it is required to double the point $P_1$ to get the point $P_2$, then the following equations can be used:

$$\tilde{x}_2 \mu^{ex2} = \left( \frac{3\tilde{x}_1^2 \mu^{2ex1} + \tilde{a}_1 \mu^{ea1}}{2\tilde{y}_1 \mu^{ey1}} \right)^2 - 2\tilde{x}_1 \mu^{ex1} \qquad (17)$$

$$\tilde{y}_2 \mu^{ey2} = \left( \tilde{x}_1 \mu^{ex1} - \left( \left( \frac{3\tilde{x}_1^2 \mu^{2ex1} + \tilde{a}_1 \mu^{ea1}}{2\tilde{y}_1 \mu^{ey1}} \right)^2 - 2\tilde{x}_1 \mu^{ex1} \right) \right) \qquad (18)$$
$$\left( \frac{3\tilde{x}_1^2 \mu^{2ex1} + \tilde{a}_1 \mu^{ea1}}{2\tilde{y}_1 \mu^{ey1}} \right) - \tilde{y}_1 \mu^{ey1}$$

It is obvious that the four exponents of the curve to which the result belongs are independent from the exponents used for the curves to which operands belong. Hence, they can be determined in many ways. This includes, but is not limited to, being chosen randomly or based on some agreed upon rules.

In addition, these four exponents can be linked to the four exponents of the operand curves by any set of functions including using elliptic curve group addition. In such cases, the resultant curve will be determined fully or partially by the operand curves.

6. The Isomorphic Floating Elliptic Curve (IFEC)

In an Isomorphic Floating Elliptic Curve (IFEC), the four exponents are related to allow their removal from the elliptic curve equation, which enhances both time and space efficiency of the operation.

6.1 Definition

As already mentioned, an elliptic curve defined over GF(p) is represented by equation (9). Since $a \in K$ and $b \in K$, they can be represented using the floating finite field $\tilde{K}$ as $${}^{ea}\tilde{a} = \mu^{-ea} a$$

and $${}^{eb}\tilde{b} = \mu^{-eb} b, \qquad (19)$$

respectively. As previously mentioned, ${}^0\tilde{a} = a$ and ${}^0\tilde{b} = b$. By multiplying the elliptic curve equation above with the terms $\mu^{-ea}$ and $\mu^{-eb}$, one obtains, $$y^2 \mu^{-ea} \mu^{-eb} = x^3 \mu^{-ea} \mu^{-eb} + ax\mu^{-ea} \mu^{-eb} + b\mu^{-ea} \mu^{-eb} \qquad (20)$$

Using the expressions for ${}^{ea}\tilde{a} = \mu^{-ea} a$ and ${}^{eb}\tilde{b} = \mu^{eb} b$, one obtains $$y^2 \mu^{-ea} \mu^{-eb} = x^3 \mu^{-ea} \mu^{-eb} + {}^{ea}\tilde{a} x \mu^{-eb} + {}^{eb}\tilde{b} \mu^{-ea} \qquad (21)$$

To ensure that the resultant curve is isomorphic to the original one, the following condition must be satisfied:

$$e_b = \frac{3}{2} e_a \qquad (22)$$

Substituting for $e_b$ in equation (21), and writing ${}^{ea}\tilde{a}$ as $\tilde{a}$ and ${}^{eb}\tilde{b}$ as $\tilde{b}$ for simplicity, one obtains, $$y^2 \mu^{-\frac{3}{2}e_a} = x^3 \mu^{-\frac{3}{2}e_a} + \tilde{a} x \mu^{-\frac{1}{2}e_a} + \tilde{b} \qquad (23)$$

which can be rewritten as $$\left( y \mu^{-\frac{3}{4}e_a} \right)^2 = \left( x \mu^{-\frac{1}{2}e_a} \right)^3 + \tilde{a} x \mu^{-\frac{1}{2}e_a} + \tilde{b} \qquad (24)$$

If $x \in K$ and $y \in K$ are transformed as follows:

$$\tilde{x} = x \mu^{-\frac{1}{2}e_a}$$
$$\tilde{y} = y \mu^{-\frac{3}{4}e_a} \qquad (25)$$

then by substitution, the above equation becomes:

$$\tilde{y}^2 = \tilde{x}^3 + \tilde{a}\tilde{x} + \tilde{b} \qquad (26)$$

Assuming $\sqrt{\mu} \notin K$ without loss of generality, $e_a$ must be a multiple of 4 to ensure that the above equation describes an elliptic curve that is isomorphic to the base curve, since it ensures that all applied transformations are bijective. Similar transformation steps can be applied to generate isomorphic elliptic curves on $GF(p^m)$.

It is important to note that by applying this equation, it is only required to keep track of one exponent to allow for the restoration of the previous curve and point values. However, if this is not required, then even that exponent can be discarded.

Based on the preceding discussion, if an elliptic curve $E_{a,b}$, in which a and b are the curve parameters, is chosen to be the base curve, then different values of $e_a$ define a family of elliptic curves that are isomorphic to $E_{a,b}$. The parameter $e_a$ can then be denoted as the curve transformation parameter. Consequently, points on one curve can be transformed to their isomorphic images on another curve. To transform a point $\tilde{P}_1(\tilde{x}_1, \tilde{y}_1)$ on the elliptic curve $E_{\tilde{a}_1, \tilde{b}_1}$, which is isomorphic to $E_{a,b}$ with a parameter $e_{a1}$, to its isomorphic image $\tilde{P}_2(\tilde{x}_2, \tilde{y}_2)$ on the elliptic curve $E_{\tilde{a}_2, \tilde{b}_2}$, which is an isomorphic curve with a parameter $e_{a2}$, $\tilde{x}_2$ and $\tilde{y}_2$ are calculated in terms of $\tilde{x}_1$ and $\tilde{y}_1$, respectively, as follows:

$$\tilde{x}_2 = x\mu^{-\frac{1}{2}e_2} = \left(\tilde{x}_1\mu^{\frac{1}{2}e_{a1}}\right)\mu^{-\frac{1}{2}e_{a2}} = \tilde{x}_1\mu^{\frac{1}{2}(e_{a1}-e_{a2})} \quad (27)$$

$$\tilde{y}_2 = y\mu^{-\frac{3}{4}e_{a2}} = \left(\tilde{y}_1\mu^{\frac{3}{4}e_{a1}}\right)\mu^{-\frac{3}{4}e_{a2}} = \tilde{y}_1\mu^{\frac{3}{4}(e_{a1}-e_{a2})} \quad (28)$$

where P(x,y) is the isomorphic image of $\tilde{P}_1(\tilde{x}_1,\tilde{y}_1)$ and $\tilde{P}_2(\tilde{x}_2,\tilde{y}_2)$ on $E_{a,b}$.

This leads directly to the definition of point operations with operands belonging to different curves, as will be shown in the next section.

The combination of $E_{a,b}$ with a set of possible values for $e_a$ results in a set of isomorphic curves, denoted as an Isomorphic Floating Elliptic Curve (IFEC), which is a special case of an FEC defined in section 5. It should be obvious that IFEC is a floating group.

It should be recognized that since this is an isomorphic transformation, it cannot transform a non-supersingular curve into a supersingular one. Hence, IFEC does not lead to any threats on the security of the ECC system.

6.2 Point Operations in IFEC

This section introduces point operations on IFEC using the affine coordinates. However, it is possible to apply the same procedures described here on any projective coordinates that are usually used to enhance the efficiency of the calculations by eliminating intermediate division operations.

A. Point Addition:

Let $E_{a,b}$ be an elliptic curve defined by equation (9) and let $\tilde{P}_1(\tilde{x}_1,\tilde{y}_1)$ be a point on the elliptic curve $E_{\tilde{a}_1,\tilde{b}_1}$, which is isomorphic to $E_{a,b}$ with a parameter $e_{a1}$. Similarly, let $\tilde{P}_2(\tilde{x}_2, \tilde{y}_2)$ be a point on the elliptic curve $E_{\tilde{a}_2,\tilde{b}_2}$, which is another isomorphic curve with a parameter $e_{a2}$. It is required to add $\tilde{P}_1$ and $\tilde{P}_2$ to get a point $\tilde{P}_3(\tilde{x}_3,\tilde{y}_3)$ that falls on the curve $E_{\tilde{a}_3,\tilde{b}_3}$, which is a third isomorphic curve with a parameter $e_{a3}$. To perform the addition, $\tilde{P}_1$ and $\tilde{P}_2$ are transformed to $E_{\tilde{a}_3,\tilde{b}_3}$ where they are added. Let $P_1'(x_1',y_1')$ and $P_2'(x_2',y_2')$ be the isomorphic images of $\tilde{P}_1(\tilde{x}_1,\tilde{y}_1)$ and $\tilde{P}_2(\tilde{x}_2,\tilde{y}_2)$ on $E_{\tilde{a}_3,\tilde{b}_3}$, respectively. The following equations demonstrate the procedure:

1. Transformation into $E_{\tilde{a}_3,\tilde{b}_3}$:

$$x_1' = \tilde{x}_1\mu^{\frac{1}{2}(e_{a1}-e_{a3})} \quad (29)$$

$$y_1' = \tilde{y}_1\mu^{\frac{3}{4}(e_{a1}-e_{a3})} \quad (30)$$

$$x_2' = \tilde{x}_2\mu^{\frac{1}{2}(e_{a2}-e_{a3})} \quad (31)$$

$$y_2' = \tilde{y}_2\mu^{\frac{3}{4}(e_{a2}-e_{a3})} \quad (32)$$

2. Addition in $E_{\tilde{a}_3,\tilde{b}_3}$:

$$m = \frac{y_2' - y_1'}{x_2' - x_1'} \quad (33)$$

$$\tilde{x}_3 = m^2 - x_1' - x_2' \quad (34)$$

$$\tilde{y}_3 = (x_1' - \tilde{x}_3)m - y_1' \quad (35)$$

The following equations group the operations into a single expression for each coordinate:

$$\tilde{x}_3 = \left(\frac{\tilde{y}_2\mu^{\frac{3}{4}(e_{a2}-e_{a3})} - \tilde{y}_1\mu^{\frac{3}{4}(e_{a1}-e_{a3})}}{\tilde{x}_2\mu^{\frac{1}{2}(e_{a2}-e_{a3})} - \tilde{x}_1\mu^{\frac{1}{2}(e_{a1}-e_{a3})}}\right)^2 - \tilde{x}_1\mu^{\frac{1}{2}(e_{a1}-e_{a3})} - \tilde{x}_2\mu^{\frac{1}{2}(e_{a2}-e_{a3})} \quad (36)$$

$$\tilde{y}_3 = \quad (37)$$

$$\left(\tilde{x}_1\mu^{\frac{1}{2}(e_{a1}-e_{a3})} - \tilde{x}_3\right)\left(\frac{\tilde{y}_2\mu^{\frac{3}{4}(e_{a2}-e_{a3})} - \tilde{y}_1\mu^{\frac{3}{4}(e_{a1}-e_{a3})}}{\tilde{x}_2\mu^{\frac{1}{2}(e_{a2}-e_{a3})} - \tilde{x}_1\mu^{\frac{1}{2}(e_{a1}-e_{a3})}}\right) - \tilde{y}_1\mu^{\frac{3}{4}(e_{a1}-e_{a3})}$$

Note that the choice of $E_{\tilde{a}_3,\tilde{b}_3}$ as a platform for addition is arbitrary and meant only to reduce the number of transformations needed. However, if there is any isomorphic curve that allows for more efficiency, or satisfies any other relevant criteria, then the addition should be performed on that curve. The resultant point can always be transformed later to $E_{\tilde{a}_3,\tilde{b}_3}$.

B. Point Doubling:

Similarly, doubling of a point $\tilde{P}_1(\tilde{x}_1,\tilde{y}_1)$ to get a point $\tilde{P}_2(\tilde{x}_2, \tilde{y}_2)$ on another curve is performed by applying necessary transformation. Again, the choice of the curve on which the doubling occurs is made here arbitrarily since the operation can be performed on any of the isomorphic curves. Let the operation be performed on $E_{\tilde{a}_1,\tilde{b}_1}$ to obtain the point $P_2'(x_2', y_2')$. After that, the result can be transformed to $E_{\tilde{a}_2,\tilde{b}_2}$. The following equations illustrate the doubling operation:

1. Doubling on $E_{\tilde{a}_1,\tilde{b}_1}$:

$$m = \frac{3\tilde{x}_1^2 + \tilde{a}_1}{2\tilde{y}_1} \quad (38)$$

$$x_2' = m^2 - 2\tilde{x}_1 \quad (39)$$

$$y_2' = (\tilde{x}_1 - x_2')m - \tilde{y}_1 \quad (40)$$

2. Transformation to $E_{\tilde{a}_2,\tilde{b}_2}$:

$$\tilde{x}_2 = x_2'\mu^{\frac{1}{2}(e_{a1}-e_{a2})} \quad (41)$$

$$\tilde{y}_2 = y_2'\mu^{\frac{3}{4}(e_{a1}-e_{a2})} \quad (42)$$

The following equations group the operations into a single expression for each coordinate:

$$\tilde{x}_2 = \left(\left(\frac{3\tilde{x}_1^2 + \tilde{a}_1}{2\tilde{y}_1}\right)^2 - 2\tilde{x}_1\right)\mu^{\frac{1}{2}(e_{a1}-e_{a2})} \quad (43)$$

$$\tilde{y}_2 = \left(\left(\tilde{x}_1 - \left(\left(\frac{3\tilde{x}_1^2 + \tilde{a}_1}{2\tilde{y}_1}\right)^2 - 2\tilde{x}_1\right)\right)\left(\frac{3\tilde{x}_1^2 + \tilde{a}_1}{2\tilde{y}_1}\right) - \tilde{y}_1\right)\mu^{\frac{3}{4}(e_{a1}-e_{a2})} \quad (44)$$

6.3 Point Operations in IFEC Using x-Coordinates Only

While deriving the formulas for addition and doubling, it was assumed that the values of both x and y coordinates of the resultant point are needed. However, some formulas have been derived in [12] by which the values of the y-coordinates of the operand points are not needed in the addition or doubling equations, i.e. the x-coordinate of the resultant point is calculated using only the x-coordinates of the operand points. This reduces the number of needed operations since it is no longer needed to calculate the value of the y-coordinate. This is applicable in the above equations for addition and doubling by simply using the same formulation as in [12] after applying a floating finite field transformation to it.

7. Applications of FEC in Cryptography

This section introduces some of the applications of FEC in cryptography.

As discussed below, FEC can be used (i) as a countermeasure against some attacks and/or (ii) to enhance the security of the underlying protocol against cryptanalysis.

A. Countermeasures Against Side-Channel Attacks:

As explained earlier, side-channel attacks are concerned with the possible leaked information about the cryptographic key during the implementation of a cryptographic algorithm. They are not cryptanalysis-based methods.

It is well known that the most successful measure against differential power analysis is to randomize the EC point operations [13]. FEC is an ideal mechanism to achieve such randomization in an efficient manner.

Randomization in FEC can be achieved by simply randomizing the four exponents of the curve (or the curve transformation parameter, i.e. $e_a$, in the case of IFEC), which is effectively equivalent to randomizing the choice of the curve on which a point operation is performed. Hence, this is a possible implementation of the elliptic curve hopping when it is implemented internally within the domain of a single party.

By using µ to be a power of 2, the randomizing computations can be efficiently implemented by simple shift and modulo reduction operations rather than the expensive multiplication operation used in existing methods such as randomization with projective coordinates. Due to this efficiency, new values of the exponents can be used for each individual point operation with minimum overhead.

It should also be noted that FEC also allows randomization to be carried out even at the field operation level by exploiting floating finite fields. This way the different field operations that make up a single FEC point operation can be randomized individually in an efficient manner. This can lead to a higher degree of randomization to counteract more advanced differential power analysis attacks.

It is worth elaborating on the degree of randomization that can be achieved using FEC. Even if the same message were encrypted/decrypted several times using the same key on the same hardware, the curves, points and fields used throughout the different encryption/decryption processes would be different. Hence, the power consumption and all the other parameters that can be monitored will be different for different instances of the same operation.

Further, such applications of FEC are independent of the cryptographic protocol being used. In other words, if one of the parties involved in a secure communication session is using FEC, this use is transparent to all other parties and they need not be aware of it. Such provision for an encapsulated application of floating curves without affecting the overall cryptographic protocol enables its immediate adopting in any of the existing protocols. It also motivates its usage on platforms that are highly endangered by side-channel attacks, like smartcards and wireless devices, without the need to perform any changes to their base stations.

B. Enhancing the Security of the Cryptographic Protocol:

FECs can also be used to enhance the security of elliptic curve cryptographic protocols by increasing the complexity of their cryptanalysis, and hence making them harder to break.

Typically, parties that require a secure communication session agree on a particular elliptic curve to be used for point operations. Usually, these curves are selected from a set of standard curves that are known for their strengths and published by standard organizations like NIST.

If the parties involved prefer to keep the selected curve private and at the same time exploiting the standard curves mentioned above, FEC could be used to achieve this conflicting requirement.

Using the concept of FEC, a mid-curve, which results from applying some transformations to the standard curves, can be agreed upon privately and used for exchanging data. Effectively, the private mid-curve becomes a new base curve. As mentioned earlier, the mid-curve is selected by simply selecting a value for each of the four exponents (or for $e_a$ in the case of IFEC). The values that define the mid-curve can be chosen through negotiation or encoded as part of the key. Once the mid curve is agreed upon, both scalar multiplication and data embedding are performed on this curve.

If the mid-curve is hidden, i.e. the values of the exponents are hidden, an attacker needs to find the mid curve first, which complicates the cryptanalysis. More significantly, the true power of FEC becomes more apparent if the mid-curve changes dynamically during the process, the case in which FEC is used to implement the full-fledged elliptic curve-hopping scheme discussed in section 2. In such a case, the task of the cryptanalyst would be made much harder.

It is significant to note that the feasibility of elliptic curve hopping is due to the efficiency in hopping between curves when µ is a power of 2. Therefore, elliptic curve hopping can be implemented with minimum overhead.

The hopping-sequence can be generated in a random fashion. In such a case, all relevant parties should adopt the same random-number generation mechanisms. Alternatively, the curve-hopping sequence, or in other words the sequence of values for the exponents can be determined by a prior agreement or using contextual information. The later could involve any parameter generated during the communication between the involved parties.

It is also worth noting that the hopping-sequence can also be exploited as an authentication mechanism for parties, i.e. like a session signature.

The elliptic curve hopping protocol has a special importance when an elliptic curve cryptographic system is used as a stream cipher. Assuming $m_1$ and $m_2$ are two consecutive messages, they will be encrypted in a conventional Elliptic Curve Cryptography (ECC) system as:

$$P_{c_1} = kP_B + P_{m_1},$$

$$P_{c_2} = kP_B + P_{m_2} \qquad (45)$$

where k is the key, $P_B$ is the base point, $P_{m_1}$ and $P_{m_2}$ are the points in which the two messages are imbedded, and $P_{c_1}$ and $P_{c_2}$ are the encrypted points that will be sent. Since the point $kP_B$ is common to both expressions, it is possible for an attacker to use differential analysis to compromise the key. However, if the curve hopping protocol is used, this will not be possible since the point $kP_B$ will change each time the mid-curve is changed. Hence, the curve hopping can be used to enhance the security of stream ciphers based on elliptic curves.

Finally, it should be added that the enhanced security achieved through FEC could be exploited in decreasing the size of the key, since it is expected that this will result in an approximately equivalent security to the use of a large key without using FEC.

While the invention has been described in connection with its preferred embodiments, it should be recognized that changes and modifications may be made therein without departing from the scope of the appended claims.

The invention claimed is:

1. A method for communicating securely over an insecure communication channel between a pair of correspondents using a cryptographic protocol that involves implementing respective ones of a pair of complimentary mathematical operations said method comprising the steps of:
 assembling a data string including information to be transferred from a sending correspondent to a receiving correspondent;
 performing a complimentary mathematical operation that incorporates finite field elements and operations and generating a corresponding cipher-text;
 providing security against side channel attacks and cryptanalysis by a dynamic transformation of elements between objects that share a category;
 forwarding the cipher-text over a communication channel to the receiving correspondent and performing other mathematical cryptographic operations to decrypt the cipher-text;
 in which objects that share the same category are mapped to each other through homomorphic transformations;
 wherein object hopping is facilitated using a floating object which is defined as a combination of a base object and a one-to-one parametric transformation function $\tau$ that is used to map elements of the base object to elements of homomorphic objects;
 and wherein field hopping is facilitated using a floating finite field which is defined as a combination of a base finite field and a transformation function of the form $$\tau(x,\kappa)=x\mu^{-\kappa}={}^\kappa\tilde{x}$$

where $x$, $\kappa$ and $\mu$ are field elements, and where ${}^\kappa\tilde{x}$ denotes the resulting element.

2. A method for communicating securely over an insecure communication channel between a pair of correspondents using a cryptographic protocol that involves implementing respective ones of a pair of complimentary mathematical operations according to claim 1 and wherein an addition in the floating finite field is performed by transforming operands to a common finite field and then performing the operation:

$$\kappa_3\tilde{x}_3={}^{\kappa_1}\tilde{x}_1+{}^{\kappa_2}$$
$$\tilde{x}_2=x_1\mu^{-\kappa_1}+x_2\mu^{-\kappa_2}=(x_1\mu^{\kappa_3-\kappa_1}+x_2\mu^{\kappa_3-\kappa_2})\mu^{-\kappa_3}={}^{\kappa_3}(\tilde{x}_1\mu^{\kappa_3-\kappa_1}+\tilde{x}_2\mu^{\kappa_3-\kappa_2})$$

and wherein the value of $\kappa_3$ is not influenced by $\kappa_1$ or $\kappa_2$ so that the value can be determined before the addition operation or generated at random.

3. A method for communicating securely over an insecure communication channel between a pair of correspondents using a cryptographic protocol that involves implementing respective ones of a pair of complimentary mathematical operations according to claim 2 and wherein a multiplication in the floating finite field is defined as:

$${}^{\kappa_1}\tilde{x}_1\cdot{}^{\kappa_2}\tilde{x}_2=x_1\mu^{-\kappa_1}\cdot x_2\mu^{-\kappa_2}=x_1x_2\mu^{-(\kappa_1+\kappa_2)}={}^{\kappa_1+\kappa_2}(\tilde{x}_1\tilde{x}_2)$$

and wherein a product of two floating finite field elements may fall in a finite field that is different from a finite field in which the operands fall.

4. A method for communicating securely over an insecure communication channel between a pair of correspondents using a cryptographic protocol that involves implementing respective ones of a pair of complimentary mathematical operations according to claim 3 which includes a step of randomizing a floating finite field to which a result belongs by applying a transformation operator on the result of a multiplication as follows:

$${}^{\kappa_1}\tilde{x}_1\cdot{}^{\kappa_2}\tilde{x}_2=x_1x_2\mu^{-\kappa_1-\kappa_2}=(x_1x_2\mu^{-\kappa_1-\kappa_2+\kappa_3})\mu^{-\kappa_3}={}^{\kappa_3}(\tilde{x}_1\tilde{x}_2\mu^{-\kappa_1-\kappa_2+\kappa_3})$$

wherein $\kappa_3$ indicates the finite field to which the result belongs and the value $\kappa_3$ can be randomized or set prior to the multiplication.

5. A method for communicating securely over an insecure communication channel between a pair of correspondents using a cryptographic protocol that involves implementing respective ones of a pair of complimentary mathematical operations according to claim 4 wherein hardware is provided and there is a mapping between an exponent and a parameter of the hardware on which the cryptographic operation is performed such as memory addresses.

6. A method for communicating securely over an insecure communication channel between a pair of correspondents using a cryptographic protocol that involves implementing respective ones of a pair of complimentary mathematical operations said method comprising the steps of:
 assembling a data string including information to be transferred from a sending correspondent to a receiving correspondent;
 performing a mathematical operation that incorporates finite field elements and operations in order to generate a corresponding cipher-text;
 Providing security against side channel attacks and cryptanalysis by curve hopping;
 forwarding the cipher-text over a communication channel to the receiving correspondent and performing a corresponding mathematical cryptographic operation to decrypt the cipher-text;
 and wherein curve hopping is facilitated using a floating elliptic curve which is defined by the following equation:

$$e_y\tilde{y}^2\mu^{2e_y}={}^{e_x}\tilde{x}^3\mu^{3e_x}+{}^{e_a}\tilde{a}\cdot{}^{e_x}\tilde{x}\mu^{e_x+e_a}+{}^{e_b}\tilde{b}\mu^{e_b}.$$

7. A method for communicating securely over an insecure communication channel between a pair of correspondents using a cryptographic protocol that involves implementing respective ones of a pair of complimentary mathematical operations according to claim 6 in which point operations are performed such that an operand point and a resultant point can belong to different curves.

8. A method for communicating securely over an insecure communication channel between a pair of correspondents using a cryptographic protocol that involves implementing respective ones of a pair of complimentary mathematical operations according to claim 7 in which point addition is performed according to the following equations $$\tilde{x}_3\mu^{e_{x3}}=\left(\frac{\tilde{y}_2\mu^{e_{y2}}-\tilde{y}_1\mu^{e_{y1}}}{\tilde{x}_2\mu^{e_{x2}}-\tilde{x}_1\mu^{e_{x1}}}\right)^2-\tilde{x}_1\mu^{e_{x1}}-\tilde{x}_2\mu^{e_{x2}}$$

$$\tilde{y}_3\mu^{e_{y3}}=(\tilde{x}_1\mu^{e_{x1}}-\tilde{x}_3\mu^{e_{x3}})\left(\frac{\tilde{y}_2\mu^{e_{y1}}-\tilde{y}_1\mu^{e_{y1}}}{\tilde{x}_2\mu^{e_{x2}}-\tilde{x}_1\mu^{e_{x1}}}\right)-\tilde{y}_1\mu^{e_{y1}-e_{y3}}$$

wherein $P_1(\tilde{x}_1,\tilde{y}_1)\in E_1$, $P_2(\tilde{x}_2,\tilde{y}_2)\in E_2$ and $P_3(\tilde{x}_3,\tilde{y}_3)\in E_3$, and $E_1$, $E_2$ and $E_3$ are elliptic curves with respective parameters.

9. A method for communicating securely over an insecure communication channel between a pair of correspondents using a cryptographic protocol that involves implementing respective ones of a pair of complimentary mathematical operations according to claim 8 in which point doubling is performed according to the following equations $$\tilde{x}_2\mu^{e_{x2}} = \left(\frac{3\tilde{x}_1^2\mu^{2e_{x1}} + \tilde{a}_1\mu^{e_{a1}}}{2\tilde{y}_1\mu^{e_{y1}}}\right)^2 - 2\tilde{x}_1\mu^{e_{x1}}$$

$$\tilde{y}_2\mu^{e_{y2}} =$$
$$\left(\tilde{x}_1\mu^{e_{x1}} - \left(\left(\frac{3\tilde{x}_1^2\mu^{2e_{x1}} + \tilde{a}_1\mu^{e_{a1}}}{2\tilde{y}_1\mu^{e_{y1}}}\right)^2 - 2\tilde{x}_1\mu^{e_{x1}}\right)\right)\left(\frac{3\tilde{x}_1^2\mu^{2e_{x1}} + \tilde{a}_1\mu^{e_{a1}}}{2\tilde{y}_1\mu^{e_{y1}}}\right) -$$
$$\tilde{y}_1\mu^{e_{y1}}$$

wherein $P_1(\tilde{x}_1,\tilde{y}_1) \in E_1$ and $P_2(\tilde{x}_2,\tilde{y}_2) \in E_2$, and $E_1$ and $E_2$ are elliptic curves with respective parameters.

10. A method for communicating securely over an insecure communication channel between a pair of correspondents using a cryptographic protocol that involves implementing respective ones of a pair of complimentary mathematical operations according to claim 9 in which an isomorphic floating elliptic curve is defined by the following equation.

$$e_y\tilde{y}^2\mu^{2e_y} = e_x\tilde{x}^3\mu^{3e_x} + e_a\tilde{a} \cdot e_x\tilde{x}\mu^{e_x+e_a} + e_b\tilde{b}\mu^{e_b}$$

wherein $$e_a = \frac{2}{3}e_b = 2e_x = \frac{4}{3}e_y.$$

11. A method for communicating securely over an insecure communication channel between a pair of correspondents using a cryptographic protocol that involves implementing respective ones of a pair of complimentary mathematical operations according to claim 10 in which floating finite fields are used to implement basic finite field operations.

* * * * *